United States Patent [19]
Alvarez et al.

[11] 4,059,316
[45] Nov. 22, 1977

[54] BEARING RETAINING PIN FOR EARTH BORING DRILL

[75] Inventors: Joseph A. Alvarez, San Antonio; Robert J. Mills, Houston, both of Tex.

[73] Assignee: Reed Tool Company, Houston, Tex.

[21] Appl. No.: 697,810

[22] Filed: June 21, 1976

[51] Int. Cl.² .............................................. F16C 19/00
[52] U.S. Cl. .................................................... 308/8.2
[58] Field of Search ................. 308/8.2; 175/227, 371, 175/372

[56] References Cited
U.S. PATENT DOCUMENTS

| 2,651,501 | 9/1953 | McMahon | 308/8.2 X |
| 3,847,234 | 11/1974 | Schumacher et al. | 308/8.2 X |

Primary Examiner—Joseph F. Peters, Jr.
Assistant Examiner—Gene A. Church
Attorney, Agent, or Firm—Neal J. Mosely

[57] ABSTRACT

A roller cutter type earth boring drill having a ball bearing race filled with ball bearings through an external passage has the passage filled with a bearing retaining plug having a symmetrically cut end portion fitting the curvature of the bearing race.

4 Claims, 2 Drawing Figures

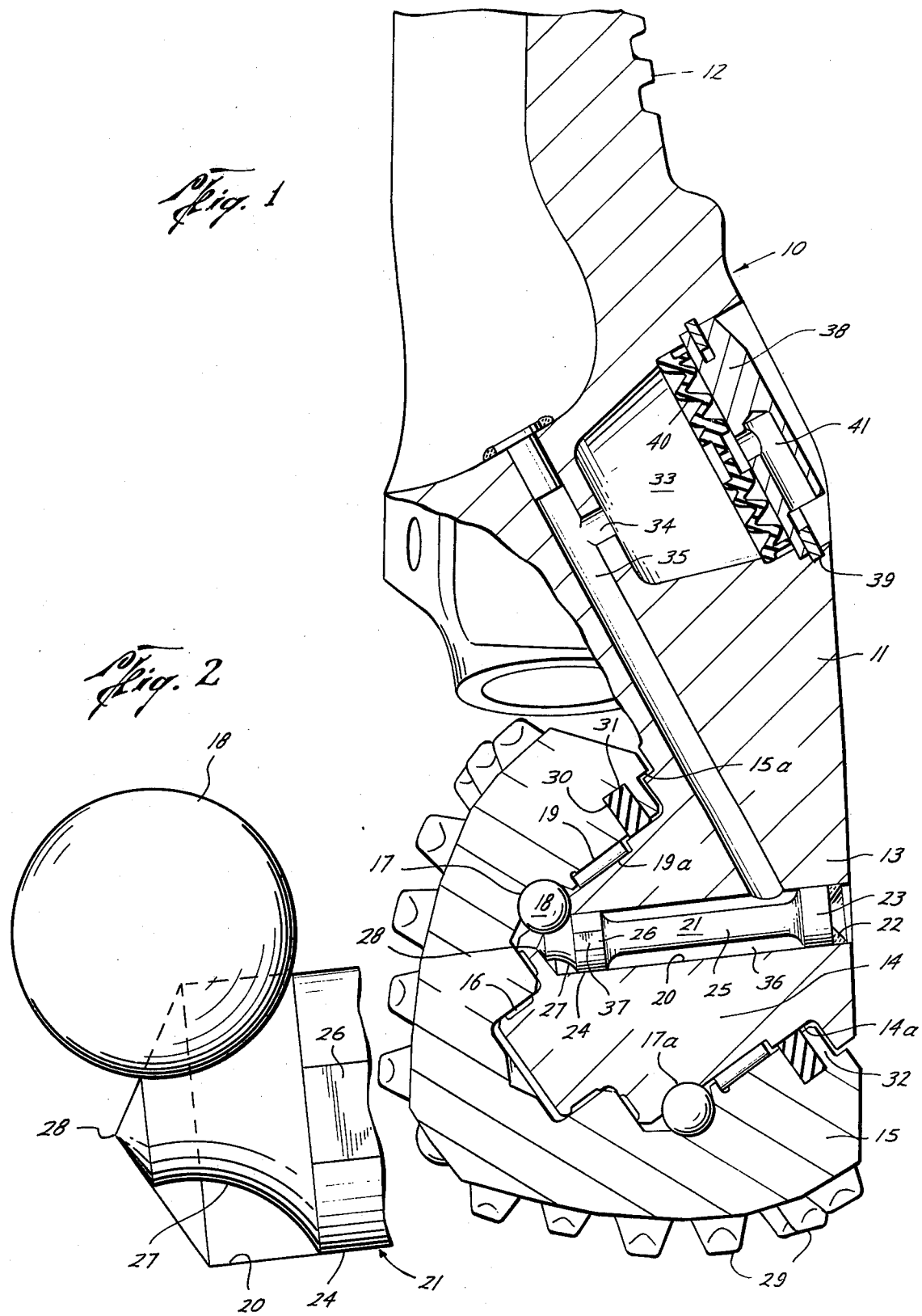

BEARING RETAINING PIN FOR EARTH BORING DRILL

BACKGROUND OF THE INVENTION

1. Field of the Invention

This invention relates to new and improved earth drilling bits having an improved retaining pin securing ball bearings in place in the bearing race for the cutter elements of the drill bits.

2. Brief Description of the Prior Art

In the manufacture of earth drilling bits, and more particularly three cutter bits of the conical cutter element type, the cutters are provided with ball bearings secured in a bearing race and introduced through a hole extending to the outside of the cutter support. A plug is normally provided in this hole to secure the bearings in place, which plug has an end portion cut to a curvature fitting the curvature of the bearing race. Murdoch et al U.S. Pat. No. 3,765,495 and Schumacher et al U.S. Pat. No. 3,847,234 disclose bearing retaining pins for earth boring drill bits which are typical of those in present commercial use and typical of the prior art in general. The bearing pins are introduced into the hole through which the bearings are inserted and have an end portion cut to fit the bearing race. The bearing retaining pins, however, are cut asymmetrically and must be aligned accurately to insure that the curvature of the end of the pin fits accurately with the curvature of the bearing race.

SUMMARY OF THE INVENTION

The present invention relates to an improved bearing retaining pin for use in an earth boring drill bit, particularly the drill bit of the multiple roller cutter type.

An object of the present invention is to provide an improved bearing retaining pin which will secure ball bearings in a bearing race in a drill bit without danger of misalignment and damage to the bearings or the bit.

Another object is to provide an improved bearing retaining pin having an end surface cut symmetrically to the curvature of the ball bearing race and positioned in a bearing retaining passage in an earth boring drill bit to secure ball bearings in place with the end portion fitting the curvature of the bearing race.

Other objects of the invention will become apparent from time to time throughout the specification and claims as hereinafter related.

BRIEF DESCRIPTION OF THE DRAWINGS

FIG. 1 is a vertical sectional view through one leg of a drill bit having a conical cutter thereon and illustrating the preferred form of the improved ball bearing retaining pin of the present invention.

FIG. 2 is an enlarged detailed view showing the relation of the bearings to the end of the bearing retaining pin.

DESCRIPTION OF THE PREFERRED EMBODIMENT

In FIG. 1, the subject invention is illustrated as applied in a roller cutter of the type generally shown in U.S. Pat. No. 3,765,495. The arrangement of bearings and bearing retaining pin obviously could be applied to any roller cutter type bit or similar earth boring apparatus.

In FIG. 1, there is shown at 10 a cone cutter type of earth drill of generally conventional construction comprising a bit head 11 and a threaded shank 12 for connection to a drill stem (not shown). A cutter support 13 extends downwardly from the bit head and a bearing shaft 14 extends downwardly and inwardly from the support 13. The bearing shaft 14 extends from a cylindrical boss 14a on the support 13 which will be described more fully hereinafter.

A roll cutter 15 of generally conical shape is mounted on bearing shaft 14 and has a counterbore 15a at its open end fitting over the cylindrical boss 14a on the support 13. The roller cutter cone 15 is supported on friction bearing 16 on the shaft 14 and has a peripherial groove or bearing race 17 aligned with groove 17a on bearing shaft 14 and in which there are positioned ball bearings 18.

The cutter 15 has a inner bore 19 providing a bearing surface which rides on a bushing 19a of the floating type. Bushing 19a floats between the bore or bearing surface 19 of roller cone cutter 15 and the outer surface of bearing shaft 14. Bushing 19a may be of any suitable material of construction such as borided steel or hardened beryllium-copper alloy or the like. The bushing should be of sufficient strength and toughness to stand the wear of the roller cutter and should be of sufficient hardness and surface lubricity to resist extrusion or galling.

In assembling the cutter 15 on shaft 14, the ball bearings 18 are inserted through passage 20 and held in place by a retaining pin 21. Ball bearing retaining pin 21 is welded in place as indicated at 22 and prevents the bearings from coming out of the hole or passage 20. Bearing retaining pin 21 has enlarged end portions 23 and 24 which fill the passage 20 and a central portion 25 which is turned down in diameter to allow for passage of grease or other lubricant. Portion 24 of the retaining pin has a flat portion 26 milled thereon which cooperates with the wall of passage 20 to provide a passage for flow of lubricant to the area of the bearings. The end portion retaining pin 21 is cut as indicated at 27 to a symmetrical curvature matching the curvature of bearing race 17a. The end portion 27 is cut to shape by turning on a lathe or similar cutter to provide a symmetrical cutting surface so that the surface fitting the bearing race matches the exposed surface regardless of the orientation of the retaining pin in the passage 20. The size of passage 20 is sufficiently great that its intersection with bearing race 17a provides an opening sufficiently large for insertion of the bearings 18. The end 28 of passage 20 fits the conical end of retaining pin 21 and secures the same longitudinally in position with the curved surface 27 aligned with bearing race 17a. The cutter 15, shaft 14, support 13 and associated parts may be made of alloy steel and the cutter 15 preferably has inserts 29 therein of tungsten carbide or other suitable cutting elements.

The cutter 15 has a groove 30 adjacent to the open end of the cutter. A sealing ring 31, which may be made of a suitable elastomeric material, such as Buna-N or the like is positioned in groove 30. The sealing ring 31 may be an "O" ring or may be of rectangular cross section or oval or other elongated cross section as in U.S. Pat. No. 3,765,495. The radial dimension of the ring, in the case of a radially elongated ring, is preferably at least one-and-one-half times the axial dimension. The sealing ring 31 may be an "O" ring but in such case the dimensions of groove 30 would be adjusted to accommodate it. It is also possible in alternate constructions of types well known in the art that the sealing ring may be located between the end wall of the cutter and the bearing surface of bearing shaft 14. The particular sealing arrangement is not a part of the invention and any lubricant seal of the type known to the art may be used in any given cutter construction.

A flange portion 32 lies between groove 30 and counterbore 15a and helps to confine and protect the outboard side of sealing ring 31 from being damaged by detritus or formation cuttings. The flange 32 and counterbore 15a define a tortuous passage which prevents ingress of detritus or formation cuttings to the region of the sealing ring. The groove 30 confines sealing ring 31 so that it does not tip or tilt axially to any substantial extent. The groove finish may be relatively rough since it is preferred that the sealing ring 31 rotate with cutter 15 and slide on bearing shaft 14.

A grease reservoir 33 in bit head 11 serves to provide lubricant to the cutter bearing through aperture 34 and passageway 35 in the bit head and support 13 and channels 36 and 37 in retaining pin 21. The reservoir 33 has a closure 38 secured in place by a snap ring 39. The closure 38 also serves to keep in place a flexible diaphragm 40 which seals the reservoir 33 from contaminants outside the drill bit. The closure 38 has a passageway 41 in communication with the outside of diaphragm 40 and the exterior of the drill bit so that the pressure on the lubricant system is generally in balance.

The construction described above, with the exception of cylindrical boss 14a and counterbore 15a and the novel bearing retaining pin 21 is disclosed essentially in U.S. Pat. No. 3,765,495. The retaining pin 21 with its symmetrically curved, turned end portion 27 which fits the curvature of bearing race 17a is operable to retain bearings 18 in place and fits the curvature of the bearing race regardless of the orientation of pin 21 in passage 20. This turned end portion 27 avoids the problem of misorientation of bearing retaining pins in the prior art which would sometimes result in damage to the bearings or to the cutters if the retaining pins were misaligned with the bearing race.

We claim:

1. A roller cutter earth boring bit comprising:
 a bearing shaft arranged on said bit,
 a roller cutter mounted on said shaft,
 a peripheral bearing race on said shaft,
 a peripheral bearing race on the inner surface of said cutter and cooperating with said first named bearing race,
 a plurality of ball bearings positioned between said bearing races,
 a passageway in said shaft extending to said first named bearing race for introduction of ball bearings thereto,
 a bearing retaining pin secured in said passageway and having an end portion with a symmetrical surface curvature fitting the curvature of said first named bearing race to secure said ball bearings therein.

2. A roller cutter earth boring bit according to claim 1 in which said bearing retaining pin has said curved surface symmetrical with respect to its longitudinal axis so that said surface fits said first named bearing race without regard to the angular orientation of said pin in its passageway.

3. A roller cutter earth boring bit according to claim 2 in which said pin is cylindrical in shape, fitting said passageway, has a central portion of reduced diameter for passage of lubrication thereby, and has an end portion turned to a symmetrical curvature fitting said first named bearing race.

4. A roller cutter earth boring bit according to claim 3 in which said turned portion on said bearing retaining pin has a radius of curvature which is the same as said first named bearing race and said ball bearings.

* * * * *